United States Patent [19]
Moran

[11] Patent Number: 6,093,433
[45] Date of Patent: Jul. 25, 2000

[54] PROCESS FOR PRESERVING PRODUCT QUALITY OF LYCHEE

[75] Inventor: Israel Moran, Carmei Yosef, Israel

[73] Assignee: Juran Metal Works Ltd., Roshon Le Zion, Israel

[21] Appl. No.: 09/361,494

[22] Filed: Jul. 26, 1999

[30] Foreign Application Priority Data

Jul. 26, 1998 [IL] Israel ........................................ 125508

[51] Int. Cl.$^7$ ....................................................... A23B 7/00
[52] U.S. Cl. .......................... 426/270; 426/304; 426/308; 426/310; 426/321; 426/331
[58] Field of Search .................................... 426/270, 304, 426/310, 308

[56] References Cited

U.S. PATENT DOCUMENTS

| 4,751,091 | 6/1988 | Nip | 426/268 |
| 6,007,855 | 12/1999 | Creed | 426/615 |
| 6,030,927 | 2/2000 | Hodgkinson | 504/357 |

OTHER PUBLICATIONS

Gardner 1966 Food Acidulants Allied Chemical Corporation New York p. 7.
Furea 1972 CRC Handbook of Food Additives vol. 1, 2nd Edition CRC Press, Boston p. 867.
Frosts Abstract #353286 Bagshaw Queensland Fruit & Vegetable News 1994 65(11) 12–13.
Frosts Abstract #456732 Jiang et al 1997 Tropical Science 1997 37(3)189–192.
Salunkhe 1984 Postharvest Biotechnology of Fruits vol. II CRC Press Inc, Fluoda p. 77–80.

*Primary Examiner*—Carolyn Paden
*Attorney, Agent, or Firm*—Townsend and Townsend and Crew LLP

[57] ABSTRACT

An improved process for preserving the product quality of lychee fruit, particularly the pericarp color comprising the following steps; (i) treating fresh lychee fruit with cold water; (ii) treating the lychee fruit with hot water; (iii) treating the lychee fruit with hydrochloric acid; (iv) drying the liquid on the fruit.

18 Claims, No Drawings

PROCESS FOR PRESERVING PRODUCT QUALITY OF LYCHEE

FIELD OF THE INVENTION

The present invention concerns an improved, convenient, environmentally compatible process for preserving the product quality of lychee fruit, particularly the pericarp color.

BACKGROUND OF THE INVENTION

The Lychee (Litchi chinensis) and its relatives are highly regarded exotic fruits. The lychee is extensively grown in the sub-tropical south east Asia, where it seems to have been cultivated for well over a thousand years. While the main country of origin seems to have been China, in recent years it has been cultivated and grown, both for domestic use and export, in a number of additional countries, including Israel, South Africa and Thialand.

Lychees are a very palatable fruit and are highly regarded as a dessert, either in the form of the fruit itself as such, or as a major component in various combinations.

Lychees are usually harvested in the early summer, and can be kept at usual room temperatures without spoiling for only about 1–3 days. Under refrigeration, usually in the vicinity of 10° C., untreated lychee can be kept a bit longer, for a few weeks. The color of the usual varieties of the ripe lychee (pericarp-shell) upon harvesting is reddish, usually delicate rose pink to bright strawberry-red. At ordinary room temperatures, this quickly turns to brown, often within 24 hours after harvest. Over the years, major efforts have been devoted to developing methods and conditions for extending the relatively short period of post harvest product quality and shelf lifetime, with a major emphasis on maintaining the fresh attractive color of the pericarp. The various methods that have been developed for this purpose over the years involve, refrigeration, plastic wrapping, transport in ice water and treatment with sulfur or sulfur compounds, such as, $SO_2$.

In recent years, the awareness and concern about toxic chemical residues in various agricultural and food products, have become a major public agenda item worldwide. The issue has become particularly acute in developed consumer countries, where ever increasing and prohibiting legislation is continually restricting the use of chemicals and treatments that until now have played a major role in food pest control and food stuff protection from spoilage.

For example, in recent years, it has become a common practice to treat lychee with sulfur to prevent spoilage and deterioration. This includes preventing any deterioration in the reddish pericarp color. There are now many countries, including the United States, that prohibit the import of agricultural products and food stuffs treated with sulfur. Furthermore, even when the use of certain sulfur compounds such as $SO_2$ to treat agricultural products and food stuff is allowed, there are regulations that require that this be explicitly stated on the packaging. As a result, environmentally and health concerned consumers are discouraged from purchasing such products.

Consequently, the need for an environmentally and consumer friendly process, based exclusively on food grade acceptable substances, for treating lichee to extend the relatively short period of post harvest product quality and shelf lifetime, is obvious. Such a process that extends the product quality lifetime sufficiently to allow the product to be transported to consumer markets by conventional surface transportation means rather than by expensive air transport, would be particularly desirable.

It is therefore an object of certain aspects of the present invention to provide an improved, convenient, environmentally compatible process for preserving the product quality of lychee fruit, particularly the pericarp color.

It is a further object of certain aspects of the present invention to provide such a process that will extend the product quality and post harvest shelf lifetime sufficiently, so as to allow the use of common surface transportation means to transport the lychee fruit to distant consumer markets.

It is yet a further object of certain aspects of the present invention to provide such a process that is based on relatively simple, readily available, food grade substances.

It is yet a further object of certain aspects of the present invention to provide such a process that is relatively simple to implement.

SUMMARY OF THE INVENTION

In accordance with certain aspects of the present invention, there is provided an improved process for preserving the product quality of lychee fruit, particularly the pericarp color comprising the following steps;

(i) treating fresh lychee fruit with cold water;
(ii) treating the lychee fruit With hot water;
(iii) treating the lychee fruit with hydrochloric acid;
(iv) drying the liquid on the fruit.

In accordance with certain other aspects of the present invention, there is provided lychee treated in accordance with the process of the present invention, so as to maintain its product quality and attractive appearance for an extended period of time.

The temperature range for the cold water treatment of the process of the present invention should generally be between 1° C. and 10° C., preferably between 4° C. and 5° C.

The temperature range for the hot water treatment should generally be between 65° C. and 80° C., preferably between 70° C. and 72° C.

The concentration range for the hydrochloric acid treatment should generally be between 2.5% and 5%, preferably between 3% and 4%.

The cold and hot water treatments may be implemented for example, by dipping, spraying or other methods of application suitable for such purposes.

DETAILED DESCRIPTION OF THE INVENTION

The present invention can be illustrated by the following non-limiting examples:

EXAMPLE 1

A batch of 100 kg of freshly harvested lychee fruit was dipped in a cold water bath maintained substantially between 4° C. and 8° C. for 15 minutes. The batch was then transferred to a hot water bath maintained substantially between 65° C. and 75° C. for 20 seconds. The batch was then transferred to a hydrochloric acid bath 1.5 minutes, the hydrochloric acid concentration being 2.5%. The batch was then dried at ambient conditions.

The batch so treated was maintained in refrigeration at about plus 2° C. to minus 1° C., for five weeks. After this time, the lychee fruit maintained its organoleptic qualities and the attractive reddish color of the pericarp was maintained as well.

EXAMPLE 2

The procedure of Example 1 was repeated, except that the cold water was applied by spraying. Essentially the same results were obtained.

EXAMPLE 3

The procedure of Example 1 was repeated, except that the hot water was applied by spraying. Essentially the same results were obtained.

EXAMPLE 4

The procedure of Example 1 was repeated, except that the hydrochloric was applied by spraying. Essentially the same results were obtained.

EXAMPLE 5

The procedure of Example 1 was repeated, except that the drying was facilitated by heating. Essentially the same results were obtained.

EXAMPLE 6

The procedure of Example 1 was repeated, except that the drying was facilitated by blowing with heated air. Essentially the same results were obtained.

While only certain embodiments of the invention have been hereinbefore particularly described, it will be apparent to anyone skilled in the art that many modifications and variations may be made, that do not deviate from the main features or spirit of the invention. The invention is accordingly not to be construed as restricted to such embodiments, but rather to its concept, spirit and general scope.

What is claimed is:

1. An improved process for preserving the product quality of lychee fruit, particularly the pericarp color comprising the following steps:
   (I) treating fresh lychee fruit with cold water;
   (ii) treating the lychee fruit with hot water;
   (iii) treating the lychee fruit with a solution consisting essentially of hydrochloric acid at a concentration range of 2.5% to 5%
   (iv) drying the liquid on the fruit.

2. A process as in claim 1 wherein the cold water treatment is by dipping.

3. A process as in claim 1 wherein the cold water treatment is by spraying.

4. A process as in claim 1 wherein the hot water treatment is by dipping.

5. A process as in claim 1 wherein the hot water treatment is by spraying.

6. A process as in claim 1 wherein the hydrochloric acid treatment is by dipping.

7. A process as in claim 1 wherein the hydrochloric acid treatment is by spraying.

8. A process as in claim 1 wherein the temperature of the cold water in the cold water treatment is between 1° C. and 10° C.

9. A process as in claim 1 wherein the temperature of the cold water in the cold water treatment is between 4° C. and 5° C.

10. A process as in claim 1 wherein the temperature of the hot water in the hot water treatment is between 65° C. and 80° C.

11. A process as in claim 1 wherein the temperature of the hot water in the hot water treatment is between 70° C. and 72° C.

12. A process as in claim 1 wherein the concentration of the hydrochloric acid in hydrochloric acid treatment is between 3% and 4%.

13. A process as in claim 1 wherein the hydrochloric acid treatment is by spraying.

14. A process as in claim 1 wherein the hydrochloric acid treatment is by dipping.

15. A process as in claim 1 wherein the drying step is implemented at ambient conditions.

16. A process as in claim 1 wherein the drying step is facilitated by heating.

17. A process as in claim 1 wherein the drying step is facilitated by blowing the treated fruit with heated air.

18. A lychee treated in accordance with claim 1.

* * * * *